United States Patent Office 3,057,673
Patented Oct. 9, 1962

3,057,673
PROCESS FOR DYEING PROTEIN FIBERS WITH A WATER-INSOLUBLE REACTIVE DYESTUFF
Walter Percival Mills, Brian Neville Parsons, and Cyril Yarwood Reed, all of Manchester, England, assignors to Imperial Chemical Industries Limited, London, England, a corporation of Great Britain
No Drawing. Filed Apr. 21, 1960, Ser. No. 23,652
Claims priority, application Great Britain May 8, 1959
10 Claims. (Cl. 8—54)

This invention relates to a dyeing process and more particularly it relates to a process for dyeing natural and regenerated protein fibres.

According to the invention there is provided a process for dyeing natural and regenerated protein fibres with a water-insoluble reactive dyestuff, as hereinafter defined, which comprises dyeing the natural and regenerated protein fibres with an aqueous dispersion of the said dyestuff at a pH less than 7 and subsequently raising the pH during the dyeing process.

The process of the invention may be conveniently carried out by immersing the natural and regenerated protein fibres in an aqueous dispersion of the water-insoluble reactive dyestuff containing an acid or an acid salt so that the pH of the aqueous dispersion is less than 7 and is preferably between 2 and 7, heating the dyebath for a period at a suitable temperature, for example 80° C. to 100° C., adding an alkali or an alkaline salt to raise the pH of the dyebath, preferably to a pH of between 4.5 and 8, and heating for a further period at a suitable temperature, for example 80° C. to 100° C. The dyed fibres are then removed from the dyebath, rinsed in water and dried. If desired the dyed fibres may be given a soaping treatment, for example by heating the dyed fibres in an aqueous solution of soap or synthetic detergent, the aqueous solution optionally containing an alkali such as sodium carbonate.

As examples of the acids or acid salts which may be used in the process of the invention there may be mentioned sulphuric acid, acetic acid, formic acid, phosphoric acid and sodium dihydrogen phosphate, and as examples of the alkalis or alkaline salts which may be used in the process of the invention there may be mentioned sodium carbonate, sodium hydroxide, trisodium phosphate, barium hydroxide, lithium hydroxide, sodium silicate, potassium carbonate and potassium hydroxide.

If desired mixtures of acids and/or acid salts or mixtures of alkalis and/or alkaline salts may be used in the process of the invention.

If desired the process of the invention may be carried out at temperatures above 100° C., for example at temperatures between 100° C. and 130° C. under superatmospheric pressure.

There may also be present in the dyebath substances which are commonly used in the dyeing of natural and regenerated protein fibres or agents which are used in the application of water-insoluble dyes to hydrophobic fibres for example, the disodium salt of methylene dinaphthalene sulphonic acid, condensates of ethylene oxide with a fatty alcohol, sulphonated castor oil and condensates of ethylene oxide with an alkylphenol.

By the term "water-insoluble reactive dyestuff" there is meant a dyestuff which is free from sulphonic acid and carboxylic acid groups and which contains at least one reactive halogen atom or reactive group, that is to say a halogen atom or group which is capable of reacting with the natural and regenerated protein fibres whereby the dyestuff is attached to the said fibres by a chemical bond. Examples of classes of such water-insoluble reactive dyestuffs include water-insoluble dyestuffs containing a 1:3:5-triazinyl radical carrying one or two chlorine or bromine atoms directly attached to the triazine ring, water-insoluble dyestuffs containing a pyrimidyl radical carrying one, two or three chlorine or bromine atoms directly attached to the pyrimidine ring, water-insoluble dyestuffs containing at least one γ-halogeno-β-hydroxypropylamino group, water-insoluble dyestuffs containing at least one di-(γ-halogeno-β-hydroxypropyl)amino group, water-insoluble dyestuffs containing at least one β-halogenoalkylsulphamyl group, water-insoluble dyestuffs, containing at least one β-halogenoethoxy group, water-insoluble dyestuffs containing at least one β-halogenothioethane group, water-insoluble dyestuffs containing at least one γ-halogeno-β-hydroxypropylsulphamyl group, water-insoluble dyestuffs containing at least one chloracylamino group, water-insoluble dyestuffs containing at least one halogenoacyl group, water-insoluble dyestuffs containing at least one sulphonfluoride group, water-insoluble dyestuffs containing at least one vinylsulphonylamino group, water-insoluble dyestuffs containing at least one halogenoethylsulphonyl group, water-insoluble dyestuffs containing at least one thiocyano group, water-insoluble dyestuffs containing at least one alkyl- or aryl-sulphonyloxyalkylsulphonyl group, water-insoluble dyestuffs containing at least one alkyl or aryl-sulphonyloxyalkylaminosulphonyl group, water-insoluble dyestuffs containing at least one alkyl- or arylsulphonyloxyalkylamino group, water-insoluble dyestuffs containing at least one alkyl- or arylsulphonyloxyalkoxy group, water-insoluble dyestuffs containing at least one alkyl- or arylsulphonyloxyalkylaminocarbonyl group, water-insoluble dyestuffs containing at least one acryloylamino group, water-insoluble dyestuffs containing at least one trichloroacryloylamino group, water-insoluble dyestuffs containing at least one vinylsulphonyl group or potential vinylsulphone group and water-insoluble dyestuffs containing at least one epoxypropyl group. The water-insoluble dyestuffs in these classes may be for example nitro dyestuffs or dyestuffs of the azo (which may be monoazo or polyazo) anthraquinone or phthalocyanine series which are free from sulphonic and carboxylic acid groups and which may or may not contain one or more coordinately bound metal atoms for example copper, chromium, nickel and cobalt. In the above groups the term "halogeno' is used to denote chloro and bromo, and alkyl denotes an alkyl radical containing from 1 to 6 carbon atoms.

Water-insoluble dyestuffs containing a dichloro or dibromo-1:3:5-triazinyl radical may be obtained by reacting one molecular proportion of a water-insoluble dyestuff containing a primary amino or secondary amino group with one molecular proportion of cyanuric chloride or cyanuric bromide. Water-insoluble dyestuffs containing a monochloro or monobromo-1:3:5-triazinyl radical may be obtained by reacting one molecular proportion of a water-insoluble dyestuff containing a primary amino or secondary amino group with one molecular proportion of a triazine of the formula:

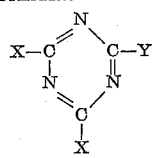

wherein X is a chlorine or bromine atom and Y stands for an alkyl, aryl or amino group or for an organic radical containing a nitrogen, oxygen or sulphur atom through which it is linked to the triazine ring.

Water-insoluble dyestuffs containing a pyrimidyl radical carrying one, two or three chlorine or bromine atoms directly attached to the pyrimidine ring may be obtained by interacting together substantially equimolecular proportions of a water-insoluble dyestuff containing a primary amino or secondary amino group and a pyrimidine containing at least two chlorine or bromine atoms in the 2, 4, 5, or 6 positions of the pyrimidine ring. As examples of suitable pyrimidines there may be mentioned 2:4:6-trichloropyrimidine,
2:4:5:6-tetrachloropyrimidine,
2:4-dibromopyrimidine,
2:4-dichloro-6-methylpyrimidine,
2:4-dichloro-6-methoxypyrimidine,
2:4-dichloro-6-phenylpyrimidine,
2:4-dichloro-6-nitropyrimidine,
2:4-dichloro-6-hydroxypyrimidine,
2:4:6-trichloro-5-nitropyrimidine,
2:4:6-trichloro-5-methylpyrimidine and
2:4-dichloro-5-nitro-6-methylpyrimidine.

Water-insoluble dyestuffs containing at least one γ-halogeno-β-hydroxypropylsulphamyl or β-halogenoalkylsulphamyl group may be obtained by treating a water-insoluble dyestuff containing at least one sulphonchloride group with a γ-halogeno-β-hydroxypropylamine or a β-halogenoalkylamine respectively.

Water-insoluble dyestufls containing at least one β-halogenoethoxy or β-halogenothioethane group may be obtained by treating a water-insoluble dyestuff containing at least one β-hydroxyethoxy or β-hydroxythioethane group with a halogenating agent.

Water-insoluble dyestuffs containing at least one γ-halogeno-β-hydroxypropylamino or di(γ-halogeno-β-hydroxypropyl) amino group may be obtained by reacting a water-insoluble dyestuff containing one or more primary amino groups with epichlorohydrin and separating the mixture of products so obtained.

Water-insoluble dyestuffs containing an epoxypropyl group may be obtained by reacting the corresponding dyestuffs containing a γ-chloro-β-hydroxypropyl group with potassium hydroxide.

Water-insoluble dyestuffs containing a vinylsulphone group may be obtained by treating with an alkali, for example potassium carbonate, the corresponding dyestuffs containing a β-sulphatoethylsulphonyl group which may themselves be obtained by sulphating the corresponding dyestuffs containing a β-hydroxy-ethyl group.

Water-insoluble dyestuffs containing at least one chloracylamino group may be obtained by treating the corresponding dyestuff containing at least one amino group with a chloracyl chloride.

Water-insoluble dyestuffs containing at least one alkyl- or arylsulphonyloxyalkylsulphonyl group, alkyl- or arylsulphonyloxyalkylsulphamyl group, alkyl- or arylsulphonyloxyalkylamino group, alkyl- or arylsulphonyloxyalkoxy group or alkyl- or arylsulphonyloxyalkylaminocarbonyl group may be obtained by reacting a water-insoluble dyestuff containing at least one hydroxyalkylsulphonyl, hydroxyalkylsulphamyl, hydroxyalkylamino, hydroxyalkoxy or hydroxyalkylamino carbonyl group respectively with an alkyl- or arylsulphonhalide respectively.

Water-insoluble dyestuffs containing at least one acryloylamino or trichloroacryloylamino group may be obtained by reacting a water-insoluble dyestuff containing at least one primary amino group with acryloylchloride or trichloroacryloyl chloride respectively.

Water-insoluble dyestuffs containing at least one vinylsulphonylamino group may be obtained by reacting a water-insoluble dyestuff containing at least one primary amino group with β-chloroethane sulphonyl chloride when the vinylsulphonylamino group is directly obtained.

Water-insoluble azo dyestuffs containing at least one halogenoacyl group or at least one sulphonfluoride group or at least one halogenoethylsulphonyl group may be obtained by coupling a diazotised amine with a coupling component, the amine and coupling component being free from sulphonic acid and carboxylic acid groups and containing at least one halogenoacyl group, or at least one sulphonfluoride group or at least one halogenoethylsulphonyl group respectively.

As specific examples of water-insoluble reactive dyestuffs which may be used in the process of the invention there may be mentioned 2-hydroxy-5-methyl-4'-(4":6"-dichloro-1":3":5"-triazin-2"-ylamino)azobenzene,
2-chloro-4-ethanesulphonyl-4'-N-β-hydroxyethyl-N-β-(4":6"-dichloro-1":3":5"-triazin-2"-ylamino)-ethylaminoazobenzene,
4-(4":6"-dichloro-1":3":5"-triazin-2"-ylamino)-2-methylazobenzene,
2-hydroxy-5-methyl-4'-(4":6"-dibromo-1":3":5"-triazin-2"-ylamino)azobenzene,
2-hydroxy-5-methyl-4'-(4"-chloro-6"-β-hydroxyethylamino-1":3":5"-triazin-2"-ylamino)azobenzene,
2-hydroxy-5-methyl-4'-(4"-chloro-6"-anilino-1":3":5"-triazin-2"-ylamino)azobenzene,
2-hydroxy-5-methyl-4'-(4"-chloro-6"-amino-1":3":5"-triazin-2"-ylamino)azobenzene,
2-chloro-4-ethanesulphonyl-4'-N-β-hydroxyethyl-N-β-(4"-chloro-6"-hydroxy-1":3":5"-triazin-2"-ylamino)-ethylaminoazobenzene,
2-hydroxy-5-methyl-4'-(4"-bromo-6"-N:N-di(β-hydroxyethyl)amino-1":3":5"-triazin-2"-ylamino)-azobenzene,
2-hydroxy-5-methyl-4'-(4"-chloro-6"-phenyl-1":3":5"-triazin-2"-ylamino)azobenzene,
4-amino-4'-(4"-chloro-6"-phenoxy-1":3":5"-triazin-2"-ylamino)azobenzene,
1-4'-(4":6"-dichloro-1":3":5"-triazin-2"-ylamino)anilinoanthraquinone,
1-4'-(4"-chloro-6"-phenoxy-1":3":5"-triazin-2"-ylamino)anilinoanthraquinone,
4'-(4"-6"-dichloro-1":3":5"-triazin-2"-ylamino)-2:4-dinitrodiphenylamine,
4'-(4"-chloro-6"-methoxytriazin-2"-ylamino)-2:4-dinitrodiphenylamine,
3'-(4"-chloro-6"-phenoxy-1":3":5"-triazin-2"-ylamino)-2-nitro-4-trifluoromethyldiphenylamine,
2-hydroxy-5-methyl-4'-(4":6"-dichloro-pyrimidine-2"-ylamino)azobenzene,
4'-nitro-4-N:N-di(γ-chloro-β-hydroxypropyl)amino-azobenzene,
1:4-bis(γ-chloro-β-hydroxypropylamino)anthraquinone,
4'-β-chloroethylsulphamylphenylazo-4-β-hydroxypropylamino)anthraquinone,
4'-β-chloroethylsulphamylphenyl-N-ethyl-N-β-hydroxyethylaminoazobenzene,
2-chloro-4-β-chloroethylsulphamyl-2'-methyl-5'-di(beta-hydroxyethyl)aminoazobenzene,
1-methylamino-4-β-chloroethylaminoanthraquinone,
1:4'-(4":6"-dichloro-1":3":5"-triazin-2-ylamino)-phenylazo-2-naphthol,
1-amino-2-β-bromoethoxy-4-hydroxyanthraquinone,
1-amino-4-hydroxy-2-β-(β'-chloroethoxy)ethoxyanthraquinone and
1-amino-4-hydroxy-2-β-(β'-bromoethoxy)ethoxyanthraquinone.

As examples of natural and regenerated protein fibres which may be dyed by the process of the invention there may be mentioned wool, silk and regenerated protein fibres made from casein or ardein.

By the process of the invention there are obtained on natural and regenerated protein fibres uniform dyeings in a wide range of bright shades which are free from the fibre to fibre unlevelness known to the trade as skitteriness and which have excellent fastness to rubbing and to wet treatments such as washing and milling.

The invention is illustrated but not limited by the following examples in which the parts and percentages are by weight:

*Example 1*

0.5 part of 1:4-di(γ-chloro-β-hydroxypropylamino)anthraquinone is dispersed in 20 parts of water and the dispersion so obtained is added to 4000 parts of water containing 1 part of an 85% aqueous solution of formic acid and 1 part of the disodium salt of methylene dinaphthalene sulphonic acid. 100 parts of wool serge are placed in the dyebath thus obtained which is then heated to 100° C. and maintained at this temperature for 30 minutes. 18 parts of disodium hydrogen phosphate dodecahydrate are then added and dyeing is continued for a further 45 minutes at a temperature of 100° C. The dyed wool serge is then removed from the dyebath, rinsed in water and dried.

The wool serge is dyed a uniform bright blue shade possessing higher fastness to wet treatments than wool serge which was dyed as described above except that the disodium hydrogen phosphate dodecahydrate was omitted from the dyebath.

*Example 2*

1 part of 4-N-methyl-N-γ-chloro-β-hydroxypropylamino-4'-1-sulphamoylazobenzene is dispersed in 20 parts of water and the dispersion so obtained is added to 4000 parts of water containing 3 parts of sulphuric acid and 2 parts of a condensate of ethylene oxide with a fatty alcohol. 100 parts of wool serge are immersed in the dyebath thus obtained which is then heated to 100° C. and maintained at this temperature for 30 minutes. 18 parts of trisodium orthophosphate dodecahydrate are then added and dyeing is continued for a further 45 minutes at a temperature of 100° C. The dyed wool serge is then removed from the dyebath, rinsed in water and dried.

The wool serge is dyed a uniform bright orange shade possessing higher fastness to wet treatments than wool serge which was dyed as described above except that the trisodium orthophosphate dodecahydrate was omitted from the dyebath.

*Example 3*

In place of the 1 part of the dyestuff used in Example 2 there is used 1 part of 1:4-di(β-bromoethylamino) anthraquinone whereby the wool serge is dyed a uniform bright blue shade possessing higher fastness to wet treatments than wool serge which was dyed as described above except that the trisodium orthophosphate dodecahydrate was omitted from the dyebath.

*Example 4*

In place of the 1 part of the dyestuff used in Example 2 there is used 0.7 part of 2-nitrodiphenylamine-4-sulphon-N-β-bromoethylamide whereby the wool serge is dyed a uniform bright yellow shade possessing higher fastness to wet treatments than wool serge which was dyed as described above except that the trisodium orthophosphate dodecahydrate was omitted from the dyebath.

*Example 5*

In place of the 1 part of the dyestuff used in Example 2 there is used 0.4 part of the monoazo dyestuff which is obtained by coupling diazotised 4-γ-chloro-β-hydroxypropoxyaniline with 1-(2'-chlorophenyl)-3-methyl-5-pyrazolone. The wool serge is dyed a uniform bright yellow shade possessing higher fastness to wet treatments than wool serge which was dyed as described above except that the trisodium orthophosphate dodecahydrate was omitted from the dyebath.

*Example 6*

In place of the 1 part of the dyestuff used in Example 2 there is used 1 part of 1:4-bis(γ-chloro-β-hydroxypropylamino)-anthraquinone whereby the wool is dyed a bright reddish-blue shade possessing higher fastness to wet treatments than wool serge which was dyed as described above except that the trisodium orthophosphate dodecahydrate was omitted from the dyebath.

What we claim is:

1. Process for dyeing fibers selected from the class consisting of natural and regenerated protein fibers which comprises immersing said fibers in an aqueous dispersion of a water-insoluble dyestuff,
   which dyestuff is free from sulfonic acid and carboxylic acid groups and which contains a reactive group which is capable of reacting with said fibers whereby the dyestuff is attached to said fibers by a chemical bond,
   and which dispersion has an acid pH of less than 7;
   heating the said aqueous dispersion with said fibers therein;
   adding a member selected from the class consisting of alkali and alkaline earth metal salts and hydroxides to raise the pH of said aqueous dispersion to a higher level of from about 4.5 to at most about 8;
   further heating the dispersion with the fibers still immersed therein; and
   thereafter removing the fibers from the dyebath, rinsing the same in water, and drying the same, whereby reacted and dyed fibers are obtained.

2. The process of claim 1, wherein said acid pH is less than 7 and not less than 2.

3. The process of claim 1, wherein said heating of the aqueous dispersion raises the temperature thereof, in each instance, to between about 80° C. and 100° C.

4. The process of claim 1, wherein said acid pH is developed by the addition to the aqueous dispersion of an acid of the class consisting of sulfuric acid, acetic acid, formic acid, phosphoric acid, and sodium dihydrogen phosphate.

5. The process of claim 1, wherein the reactive group is a 1:3:5-triazinyl radical carrying from one to two halogen atoms selected from the class consisting of chlorine and bromine.

6. The process according to claim 1, wherein said reactive group is a pyrimidyl radical carrying from one to three halogen atoms selected from the class consisting of chlorine and bromine.

7. The process according to claim 1, wherein said reactive group is a γ-halogeno-β-hydroxypropylamino group.

8. The process according to claim 1, wherein said fibers are wool fibers.

9. The process according to claim 1, wherein said water-insoluble dyestuff is selected from the class of water-insoluble dyestuffs consisting of nitro, azo, anthraquinone, and phthalocyanine water-insoluble dyestuffs.

10. The process according to claim 9, wherein said dyestuff contains a coordinately bound metal atom selected from the class consisting of copper, chromium, nickel, and cobalt.

References Cited in the file of this patent

UNITED STATES PATENTS

| | | |
|---|---|---|
| 2,670,265 | Heyna et al. | Feb. 23, 1954 |
| 2,857,235 | Coscia | Oct. 21, 1958 |
| 2,900,218 | Gray | Aug. 18, 1959 |
| 2,914,531 | Stauble et al. | Nov. 24, 1959 |
| 2,944,871 | Atkinson et al. | July 12, 1960 |
| 2,973,351 | Montmollin et al. | Feb. 28, 1961 |